(12) United States Patent
Safran et al.

(10) Patent No.: US 7,665,114 B2
(45) Date of Patent: Feb. 16, 2010

(54) SYSTEM AND METHOD FOR COLLECTING VIDEO DATA

(75) Inventors: Israel Safran, Herzlia (IL); Mordechai Shabtai, Rosh HaAyin (IL); Mordekhay Dor-On, Tel Mond (IL); Fredrick Mark Manasseh, Shoham (IL)

(73) Assignee: Nice Systems Ltd., Raanana (IL)

( * ) Notice: Subject to any disclaimer, the term of this patent is extended or adjusted under 35 U.S.C. 154(b) by 939 days.

(21) Appl. No.: 10/482,127

(22) PCT Filed: Jun. 25, 2002

(86) PCT No.: PCT/IL02/00508
§ 371 (c)(1),
(2), (4) Date: Dec. 24, 2003

(87) PCT Pub. No.: WO03/001809
PCT Pub. Date: Jan. 3, 2003

(65) Prior Publication Data
US 2004/0158869 A1    Aug. 12, 2004

Related U.S. Application Data

(60) Provisional application No. 60/300,463, filed on Jun. 26, 2001.

(51) Int. Cl.
H04N 5/222  (2006.01)
H04N 7/173  (2006.01)
(52) U.S. Cl. .................... 725/105; 348/211.3
(58) Field of Classification Search ............. 725/105, 725/109, 112, 148; 348/211.2, 211.3, 723; 386/124, 70; 715/719
See application file for complete search history.

(56) References Cited

U.S. PATENT DOCUMENTS

| | | | | |
|---|---|---|---|---|
| 5,923,817 A | * | 7/1999 | Nakamura | 386/124 |
| 6,166,729 A | * | 12/2000 | Acosta et al. | 715/719 |
| 6,522,352 B1 | * | 2/2003 | Strandwitz et al. | 348/211.2 |
| 6,891,566 B2 | * | 5/2005 | Marchese | 348/211.3 |
| 2002/0131765 A1 | * | 9/2002 | DeKeyser et al. | 386/70 |

FOREIGN PATENT DOCUMENTS

| | | |
|---|---|---|
| WO | WO 00/69161 | 11/2000 |
| WO | WO 01/13637 | 2/2001 |

* cited by examiner

*Primary Examiner*—Gims S Philippe
(74) *Attorney, Agent, or Firm*—Pearl Cohen Zedek Latzer, LLP

(57) ABSTRACT

A system and method for scalably monitoring and/or recording video data, preferably through a distributed network such as a computer network for example. The system and method of the present invention are characterized by the separation of functions, preferably into separate modules, for accessing the monitored and/or recorded data, and/or for accessing different hardware and/or software components of the system. This separation optionally and preferably is performed by restricting access to each of a plurality of layers or hierarchical levels in succession, such that access to the next layer or level is more preferably not permitted until access to a previous layer or level is approved. The system and method of the present invention also preferably provides security through this separation of functions. According to a preferred embodiment of the present invention, there is also provided a system and method for optionally adding the capability for monitoring and/or recording at least one type of media to an existing monitoring/recording system, as an "upgrade". This preferred embodiment of the present invention may optionally and preferably be combined with the previously described system and method for scalably monitoring and/or recording video data.

26 Claims, 14 Drawing Sheets

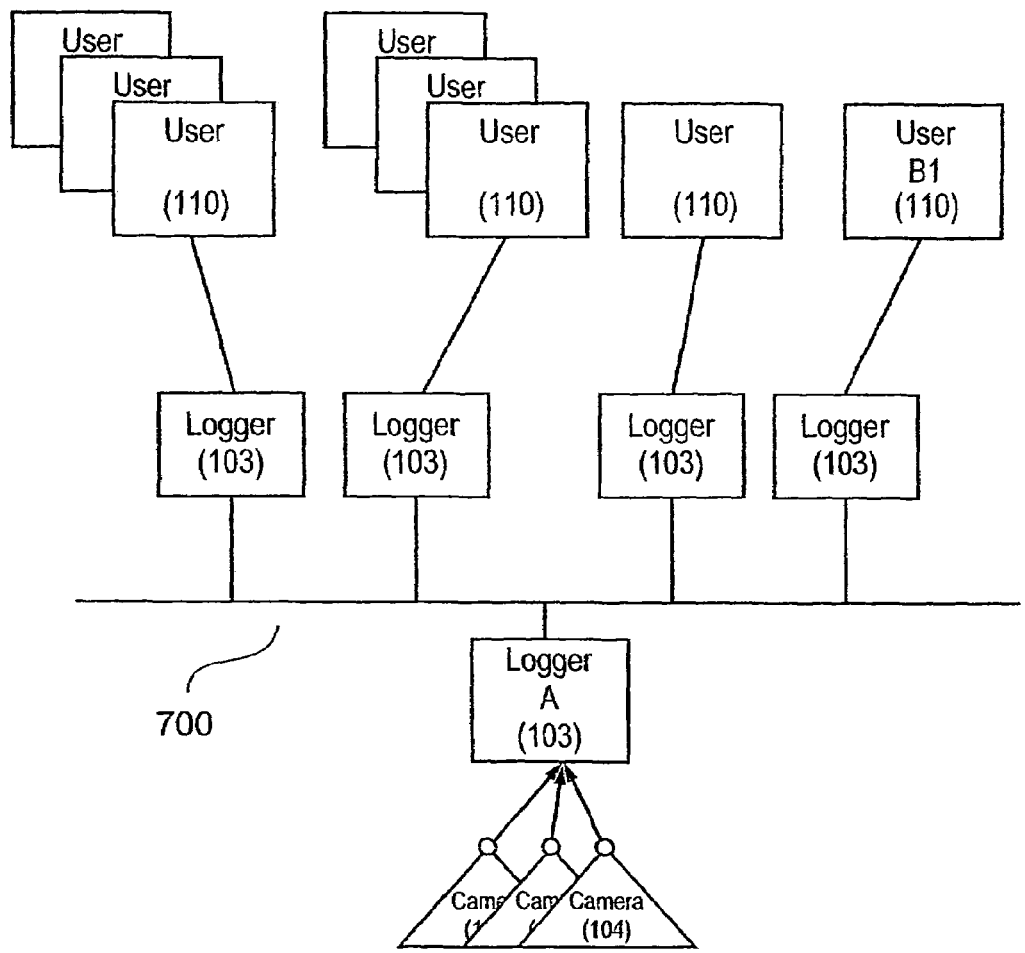
Fig. 7a1

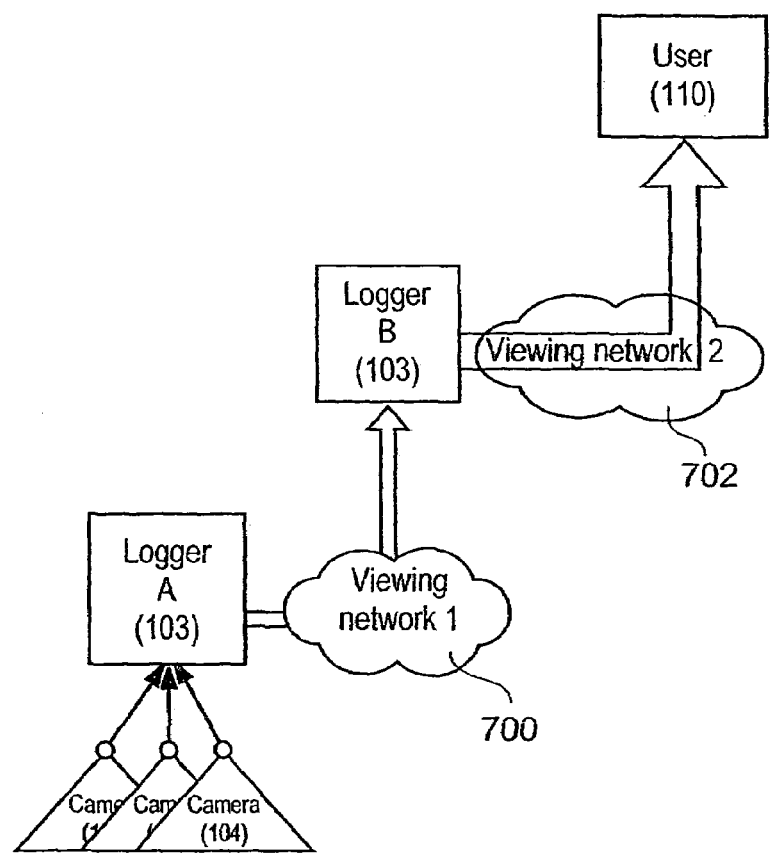
Fig. 7a2

US 7,665,114 B2

SYSTEM AND METHOD FOR COLLECTING VIDEO DATA

RELATED PATENT APPLICATION

This application is a National Phase Application of PCT/IL02/00508, filed on Jun. 25, 2002, which claims priority from U.S. Provisional Application No. 60/300,463 filed Jun. 26, 2001.

FIELD OF THE INVENTION

The present invention is of a system and method for collecting video data, and in particular, of a system and method for efficiently and scalably collecting such video data over a network. The present invention is also of a system and method for upgrading a media collection device or system to a multimedia collection device or system, and in particular for upgrading such a device or system that can originally only collect data related to a single type of media.

BACKGROUND OF THE INVENTION

Digital surveillance and recording systems are designed to provide digital management of video for security and monitoring applications. These systems are required to support multiple sites, multiple users and viewers, and to comply with a variety of storage architectures. Such systems should be flexible and scalable, in order to be able to grow as actual requirements grow.

Flexibility and scalability requirements are also a result of previous investments of organizations in other systems, which include computational processing power and networking infrastructure. In addition, these other systems may reflect other needs for recording media data, such as audio data for example. Thus, a number of different factors may influence both past and future purchasing and installation decisions for equipment (hardware and/or software, and/or other types of infrastructure) for monitoring and/or recording media data.

Many companies begin with the basic function of digital voice capture, recording and management to enable them to record the telephone and voice communications that occur during regular interactions of workers of the company. As digital voice recording and its benefits are assimilated within the organizations' operations, many look for additional areas where digital recording can further improve their business and operational processes.

Digital recording of other media, such as video, is increasingly being sought. However, adding the capabilities for recording a second type of media, such as video data, to an existing recording and/or monitoring system for a first, single type of media, such as audio for example, is currently not a simple task. For example, an organization may turn to the suppliers of digital voice recording solutions, in an attempt to obtain the additional functionality as an "upgrade" to their existing or upcoming digital voice recording systems, for commonality, logistics and cost savings reasons. However, such additional functionality can typically only be obtained by purchasing a complete system for monitoring and/or recording digital video data, which must then be added to the previously existing complete system for monitoring and/or recording digital voice data. Thus, currently available systems are merely additive in nature, as the two systems typically function separately, such that no advantage is obtained from having capabilities from recording and/or monitoring two different types of video data.

An additional problem of currently available systems for recording multiple different types of media is scalability. The requirement of adding more products and systems to fulfill the requirements of recording multimedia data clearly leads to many other practical, technical and logistical problems. For example, such requirements usually result in additional hardware, servers, applications, maintenance, and so forth. Issues of commonality, real estate and cost effectiveness become lost, since existing voice recording platforms cannot currently be used for the new multi-media recording needs.

However, problems of scalability are not limited to systems to which multimedia recording and/or monitoring functionality are added as an "upgrade". For example, currently available digital video recording systems also lack true scalability. Existing digital video recording systems are basically self-contained units, with the capacity of acquiring and recording a fixed number of video feeds. Such a formation is limited in capacity and expendability, whereas as an overall architecture, it maintains a unit-centric behavior requiring users and administrators to interact with each unit individually.

When the internal storage capacity becomes insufficient, most units are incapable of attaching archiving devices beyond the physical containment of the unit's chassis. Furthermore, these archiving devices must be pre-certified by the manufacturer, crippling the ability to exploit advancements in storage technology.

Furthermore, the channel capacity of a recording unit is typically limited by the amount of preinstalled inputs. When the need arises for additional video cameras to be recorded or viewed, an additional unit has to be installed. As mentioned earlier, this requires the operator of the system to interact with yet another unit, adding complexity and inefficiency to the whole process.

The architecture of existing systems does not provide for a robust central storage configuration. Such a configuration is mostly required in a multi-site installation, where video information should be recorded in the head office, for centralization or for disaster recovery reasons.

Another limitation is the ability to support a large number of simultaneous viewers. Most existing systems are designed to handle up to a dozen users. New systems are required to provide access for live and archived video for viewers from multiple locations, and in growing numbers.

The cumulative result of these limitations is a cumbersome architecture with limited and rigid scalability. These limitations further lead to an expensive and complex upgrade path, causing the task of expending a system's configuration to become costly and inefficient.

SUMMARY OF THE INVENTION

The background art does not teach or suggest a system or method for scalably and efficiently recording video data. The background art also does not teach or suggest such a system or method for recording video data over a distributed network, such as a computer network for example. Furthermore, the background art does not teach or suggest such a system or method for adding the capability for monitoring and/or recording at least one type of media to an existing monitoring/recording system, as an "upgrade".

The present invention overcomes these deficiencies of the background art by providing a system and method for scalably monitoring and/or recording video data, preferably through a distributed network such as a computer network for example. The system and method of the present invention are characterized by the separation of functions, preferably into separate modules, for accessing the monitored and/or recorded data, and/or for accessing different hardware and/or software components of the system. This separation optionally and preferably is performed by restricting access to each of a plurality of layers or hierarchical levels in succession, such that access to the next layer or level is more preferably not permitted until access to a previous layer or level is approved. The system and method of the present invention also preferably provides security through this separation of functions.

According to a preferred embodiment of the present invention, there is also provided a system and method for optionally adding the capability for monitoring and/or recording at least one type of media to an existing monitoring/recording system, as an "upgrade". This preferred embodiment of the present invention may optionally and preferably be combined with the previously described system and method for scalably monitoring and/or recording video data.

For example, optionally and more preferably existing digital voice recording platforms can be "upgraded" to multimedia recording platforms, by adding software modules, such that the same hardware and infrastructure can preferably be used for recording each new type of media. For example, organizations with digital voice recording systems, such as NiceLog™ (NICE Systems Ltd, Israel), would be able to add a Video recording software module, such as NiceEye™ (NICE Systems Ltd, Israel), and obtain the additional capability of video recording from cameras connected to their IP network.

Hereinafter, the term "upgrade" refers to the addition of the capability for monitoring and/or recording at least one type of media to an existing monitoring and/or recording system.

Hereinafter, the term "Web application" or "Web-based application" refers to any application in which the communication between a client and a server, two or more servers and/or two or more clients, is performed according to a Web communication protocol. One non-limiting example of such a protocol is HTTP (hypertext transfer protocol).

Hereinafter, the term "recording" includes at least one of monitoring, playing back and recording data, and may optionally include a combination thereof. Hereinafter, the term "playing back" may optionally refer to live or recorded data, or a combination thereof. Hereinafter, the term "recorded data" may optionally also refer to archived data.

BRIEF DESCRIPTION OF THE DRAWINGS

The present invention will be understood and appreciated more fully from the following detailed description, taken in conjunction with the drawings in which:

FIGS. 7A-C show exemplary scalable configurations of the system according to the present invention;

DESCRIPTION OF PREFERRED EMBODIMENTS

Figure 1:
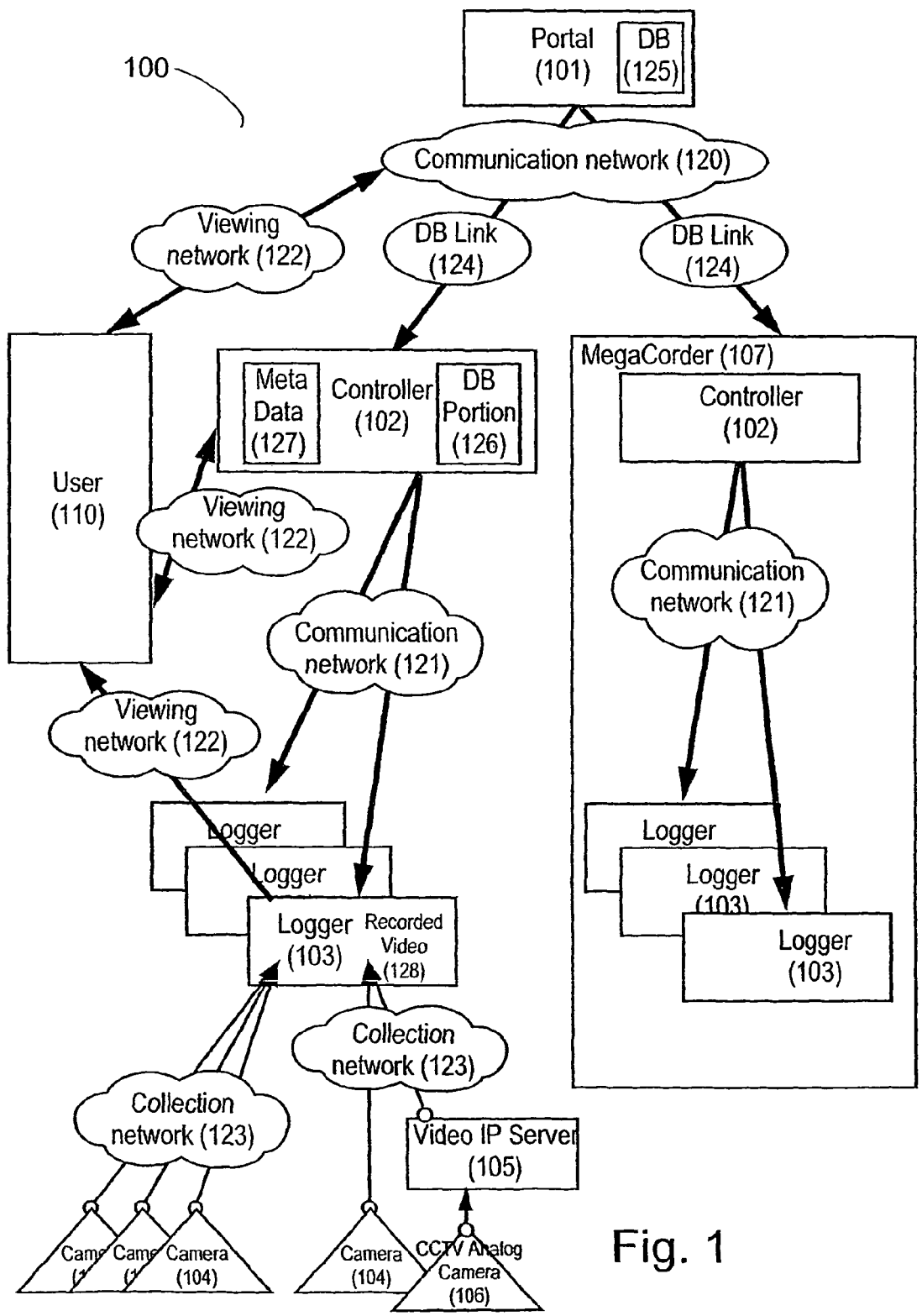
FIG. 1 shows an exemplary system according to the present invention for scalable video recording.

The present invention is of a system and method for scalably monitoring and/or recording video data, preferably through a distributed network such as a computer network for example. The system and method of the present invention are characterized by the separation of functions, preferably into separate modules, for accessing the monitored and/or recorded data, and/or for accessing different hardware and/or software components of the system. This separation optionally and preferably is performed by restricting access to each of a plurality of layers or hierarchical levels in succession, such that access to the next layer or level is more preferably not permitted until access to a previous layer or level is approved. The system and method of the present invention also preferably provides security through this separation of functions. Although the present invention is optionally implemented for recording video data, it is understood that this is for the purposes of description and without any intention of being limiting.

Digital video surveillance and recording systems are characterized by a requirement to record video from numerous video inputs (cameras, or "channels"), and the dissemination of live and recorded video for numerous viewers for monitoring and analysis. Many video systems now manage video from multiple sites, store it in various configurations (on site, centrally, regionally), and provide access for live and archived video for viewers from multiple locations. Moreover, these systems must be able to scale in the number of managed channels and overall capacity, to adapt to the growing needs of the customers and of the market.

In order to achieve a truly scalable architecture, which permits flexible growth in system capacity and viewing capabilities, the system and method of the present invention preferably feature the following characteristics. First, storage scalability, or the ability to expand discrete storage and archiving resources, is preferably provided. Bandwidth scalability is also preferably provided, which is the ability to increase the video collection capacity and delivery capacity of the system as required, preferably also on an individual basis.

Another preferred feature of the present invention is the scalability of computational resources, which provides the ability to increase and distribute computational resources to enhance the performance and capacity of the recording and/or monitoring system. A related and preferred feature is physical distribution flexibility, which is the ability to locate system resources, inputs and viewers in physically disparate locations. Furthermore, the present invention also provides viewing scalability, which is the ability to control the number of viewers, and optionally video quality and/or other factors related to video transmission, according to configuration and resources.

As a result of these capabilities, the present invention achieves linear scalability, namely, the ability to smoothly and proportionally increase the system's size and capacity in individual resources and in single-channel steps.

According to a preferred embodiment of the present invention, there is also provided a system and method for optionally adding the capability for monitoring and/or recording at least one type of media to an existing monitoring/recording system, as an "upgrade". This preferred embodiment of the present invention may optionally and preferably be combined with the previously described system and method for scalably monitoring and/or recording video data.

FIG. 1 is a schematic block diagram of an exemplary system according to the present invention. A system 100 is preferably characterized by separation of functions, and is more preferably characterized by insulation of such functions. This separation preferably requires each function to be performed before a further function is authorized. The exemplary architecture of system 100 in FIG. 1 achieves this separation with three types of components: a portal 101, a controller 102 and a logger 103. It should be emphasized that different architectures could optionally be implemented in order to achieve the desired separation. Each of these components is optionally and preferably implemented as a process that is typically executed by a server (not shown). More preferably, more than one component can optionally be operated by the same server.

According to preferred embodiments of the present invention, system 100 preferably includes only one portal 101, more preferably for communicating with a plurality of controllers 102. Portal 101 preferably communicates with each controller 102 through a communication network 120, which is optionally and more preferably implemented as a network operating according to the IP protocol. Alternatively, the network may optionally be operated according to any computer network protocol.

Controllers 102 may optionally be located at different physical locations, optionally as part of a distributed system 100. Each controller 102 preferably communicates with one or more loggers 103, more preferably through a communication network 121. As for communication network 120, communication network 121 is optionally and more preferably implemented as a network operating according to the IP protocol. Alternatively, again the network may optionally be operated according to any computer network protocol.

Loggers 103 may also optionally and preferably be located at different physical locations, again optionally for a distributed system 100. Each logger 103 may optionally and preferably communicate with either another logger 103 or alternatively with a controller 102, for management and/or data transmission purposes. With regard to receiving video data, each logger 103 preferably communicates either with another logger 103 or alternatively with one or more direct sources of video data. Examples of such sources of video data include but are not limited to, one or more IP cameras 104 and/or one or more video IP servers 105 that are connected to one or more analog cameras 106. Since analog camera 106 captures analog video signals, some type of converter is required to convert the analog signals to video data. One non-limiting, illustrative example of a converter is a video IP server 105 as shown, although of course other types of converters could be used. Logger 103 is preferably connected to each such source of video data through a collection network 123, which is again preferably implemented according to the IP network protocol, although alternatively any computer network protocol could optionally be used.

More preferably, each source of video data is assigned to a particular channel at logger 103 (not shown), in order to be able to manage transmission of data through that channel.

According to a preferred embodiment of the present invention, a user application 110 may preferably request transmission of collected video data. User application 110 is optionally and preferably implemented as a Web browser, particularly for the preferred implementation of portal 101 as a Web-based application, as described in greater detail below.

Optionally and more preferably, user application 110 may be able to control and/or otherwise access components of system 100. However, preferably such control and/or access may only be granted after communicating with portal 101. Thus, portal 101 more preferably controls all access to system 100, at least initially. The preferred flow of operations through system 100 is described in greater detail with regard to the illustrative examples of FIGS. 5A and 5B.

Portal 101 is optionally and more preferably implemented as a Web-based application for accessing different components of system 100. For example, optionally and more preferably, user application 110 must first communicate with portal 101 in order to perform the following functions: access video cameras 104 and/or 106 for live (real time) view through that camera; retrieve archived video clips from different channels; and perform resource definition and management. As such, portal 101 preferably provides the interface to define system resources and users. Portal 101 may also optionally and preferably include a database 125 to save this information.

Portal 101 preferably defines and/or at least manages a number of different types of information. For example, portal 101 preferably defines and/or at least manages the definition of channels according to one or more parameters. Examples of such parameters optionally and preferably include, but are not limited to, camera identification, analog to digital video converter identification (for example for analog cameras, whose signals are then preferably converted to digital data), alarm settings and notification for each channel, and level of service under which the channel is operated. The level of service optionally and more preferably includes parameters such as: frame rate, retention policy etc.

Portal 101 may also optionally and more preferably store system configuration definitions, most preferably for physical resource identification and layout. Examples of these parameters include but are not limited to, network addresses for loggers/controllers, connections between particular channels and loggers 103, and/or between particular loggers 103 and controllers 102, connections to external devices (not shown) that may trigger an event, connection to external devices (not shown) that are used for notification, and so forth. Portal 101 may also optionally define and/or at least manage the schedule of recording programs for channels.

According to preferred embodiments of the present invention, portal 101 controls security of system 100, more preferably with regard to access granted to user application 110 and/or security levels.

As previously described, according to preferred embodiments of the present invention, portal 101 communicates with at least one, and more preferably a plurality of, controllers 102. Each controller 102 in turn preferably fulfills at least two roles. First, each controller 102 preferably mediates between portal 101 and at least one logger 103. Therefore, more preferably each controller 102 receives those definition(s) from portal 101 which are relevant to loggers 103 and channels. Most preferably, data is synchronized between controllers 102 and loggers 103. Such synchronization is optionally and most preferably performed through a DB link 124. DB link 124 is optionally and preferably a database component, which is responsible for synchronizing data related to controller 102 and one or more associated loggers 103. DB link 124 optionally and preferably resides in controller 102, and corresponds with database 125 in portal 101 and with a DB portion 126 in controller 102.

Another important role of controller 102 is optionally and preferably managing the meta data of associated loggers 103. Logger 103 preferably saves and manages the actual frames of video, shown as recorded video 128, that are acquired by cameras 104 and/or 106, and are then transferred to logger 103. The related descriptive information to the actual frames of video preferably forms the meta data, which is preferably stored for enabling efficient access to the video data. The meta data are shown as being stored in a meta data storage 127 in controller 102. The meta data optionally and preferably includes information such as identification of the recorded segment by time and channel, and a link for fast access to the relevant frames in that segment.

Logger 103 preferably receives these video frames from cameras 104 and/or 106 through collection network 123 as previously described. Logger 103 saves the video frames in video storage 128 and sends relevant parameters (Meta Data) to controller 102 as previously described. When user application 110 sends a request to view the acquired video, at real time or after being recorded, logger 103 sends the requested video frames through viewing network 122.

According to preferred embodiments of the present invention, logger 103 also triggers alarm recording and notification. For example, logger 103 may optionally and preferably feature a software function for analyzing the video data that is received, more preferably for performing frame-by-frame analysis. If such video data includes one or more features that constitute alarm triggers, then the alarm is activated by logger 103. One non-limiting example of such a trigger is optionally the use of facial recognition software, which is known in the art and which therefore could easily be selected by one of ordinary skill in the art, to identify an individual whose presence should be considered as an alarm trigger.

Logger 103 may also optionally and preferably enable the user, through user application 110, to operate PTZ (Pan-Tilt-Zoom) of camera 104 and/or 106, manually triggered recording of data from camera 104 and/or 106, locking video clips, book marking video clips, and so forth. For the Web-based application embodiment of the present invention, which is a preferred embodiment, the interaction of logger 103 with the user is optionally and preferably performed through an applet (or any other type of Web-based application) which is part of user application 110, as described below.

The combination of one or more loggers 103 and controller 102 for being operated by the same server is shown as a megacorder 107. For this combination, communication network 121 may optionally be implemented as a communication process that is entirely contained within megacorder 107 as shown, rather than as a separate network entity.

Figure 2:
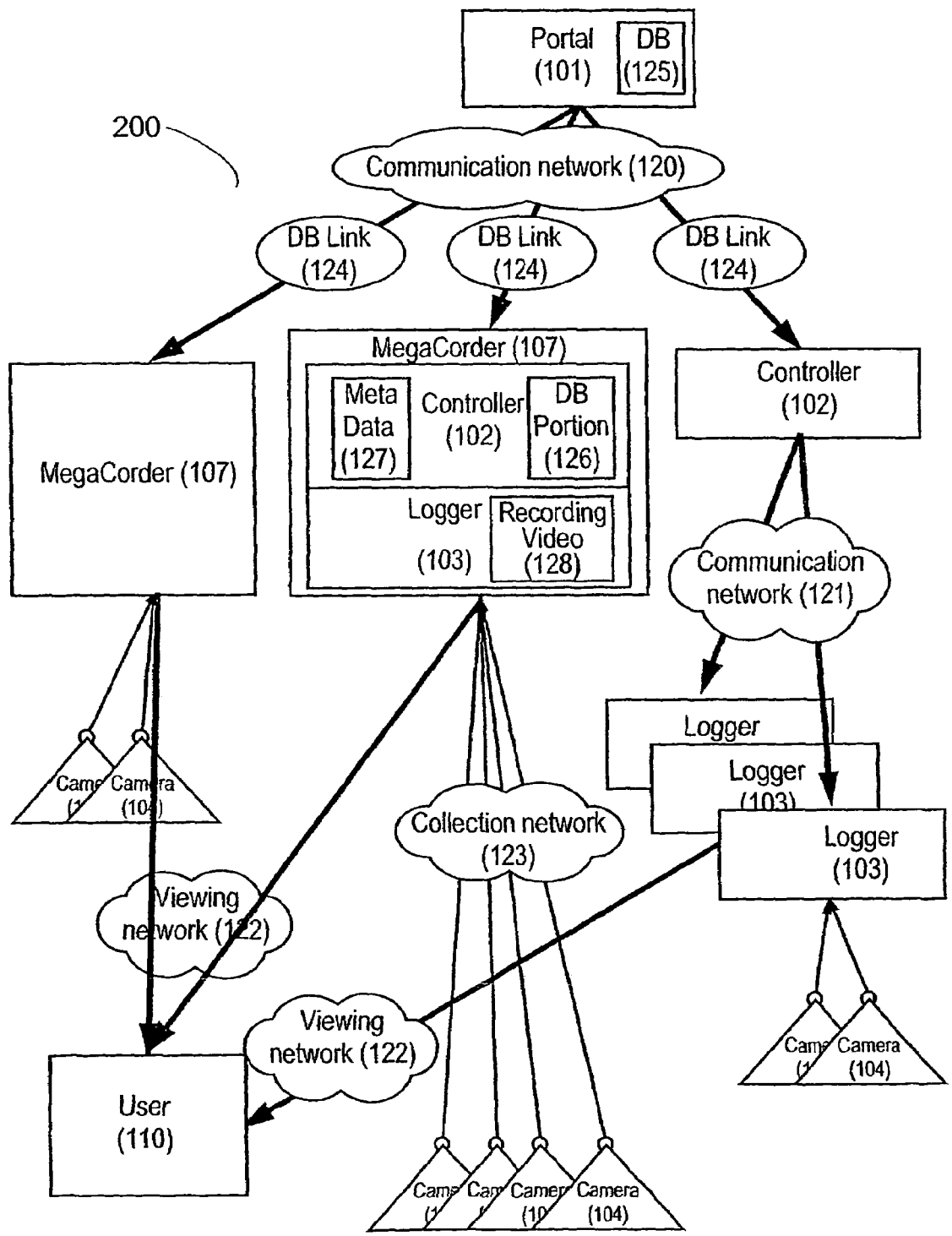
FIG. 2 shows a second exemplary system according to the present invention, with combined controller/logger.

FIG. 2 shows a second topology of a system 200, which features the same components as in FIG. 1, but arranged differently than for system 100. It should be noted that components having the same or similar function in each drawing are labeled by the same reference number. For the example in FIG. 2, system 200 preferably features a plurality of megacorders 107. Since each megacorder 107 is implemented by operating controller 102 and logger 103 in a single server, system 200 requires fewer hardware components and may therefore be less expensive to install and operate. Optionally and more preferably, no changes are required to controller 102 and logger 103 for being operated by a single server, since each of these components only requires a port and an address of the corresponding component in order to be able to communicate.

System 200 is preferred for those implementations with relatively light traffic between portal 101 and controller 102, through communication network 120.

Figure 3:
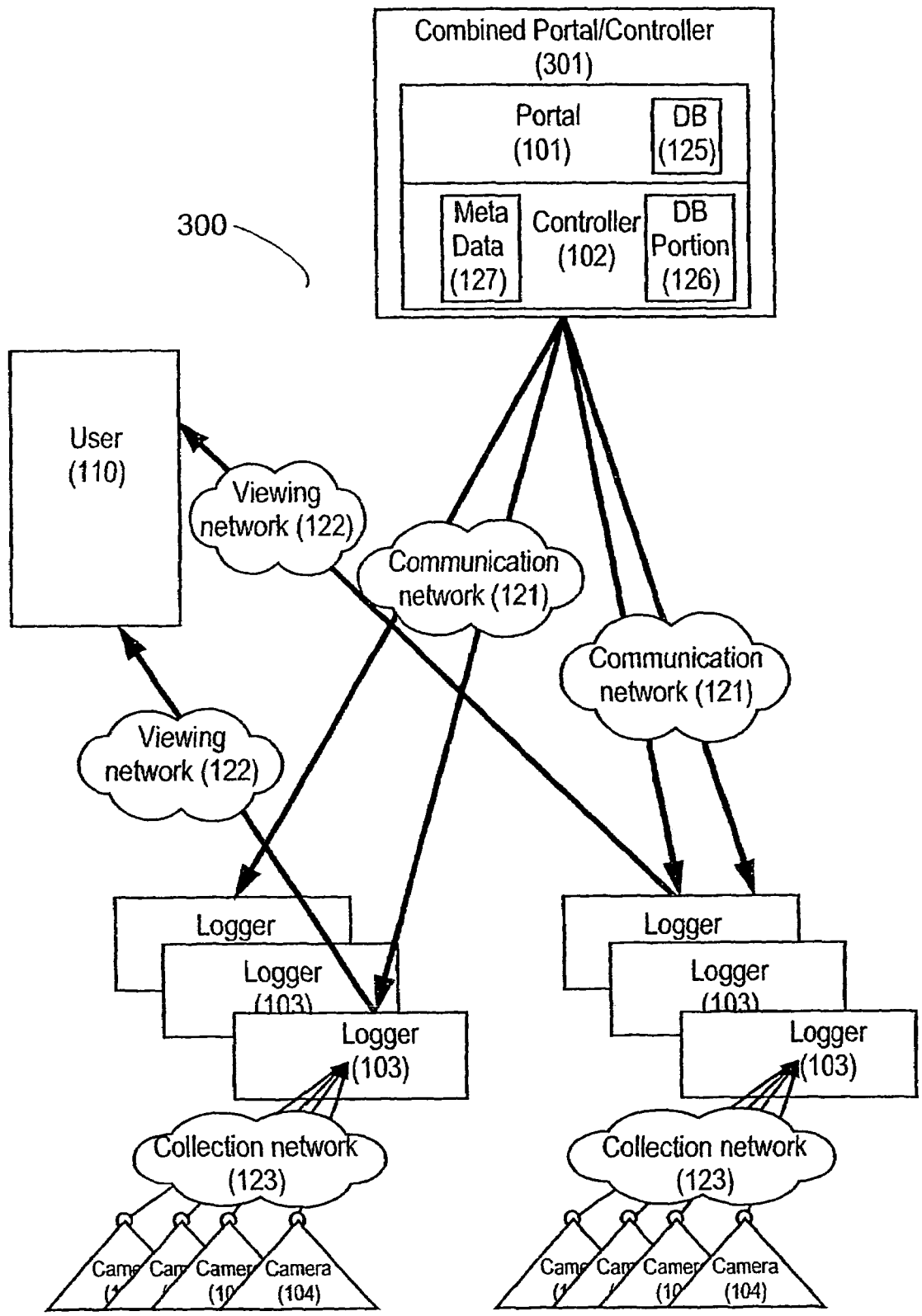
FIG. 3 shows a third exemplary system according to the present invention, with combined portal/controller.

FIG. 3 demonstrates a system 300, in which controller 102 and portal 101 are operated by a server, shown as a combined portal/controller 301. Loggers 103 are physically distributed at various locations, and communicate with combined portal/controller 301 through communication network 121. System 300 is preferred because "bursty" traffic is moved away from loggers 103 and onto combined portal/controller 301. However, system 300 requires a more robust, high bandwidth network for communication network 121, such as an enterprise network for example, which could optionally be a LAN (local area network) or a WAN (wide area network) for example.

Figure 4:
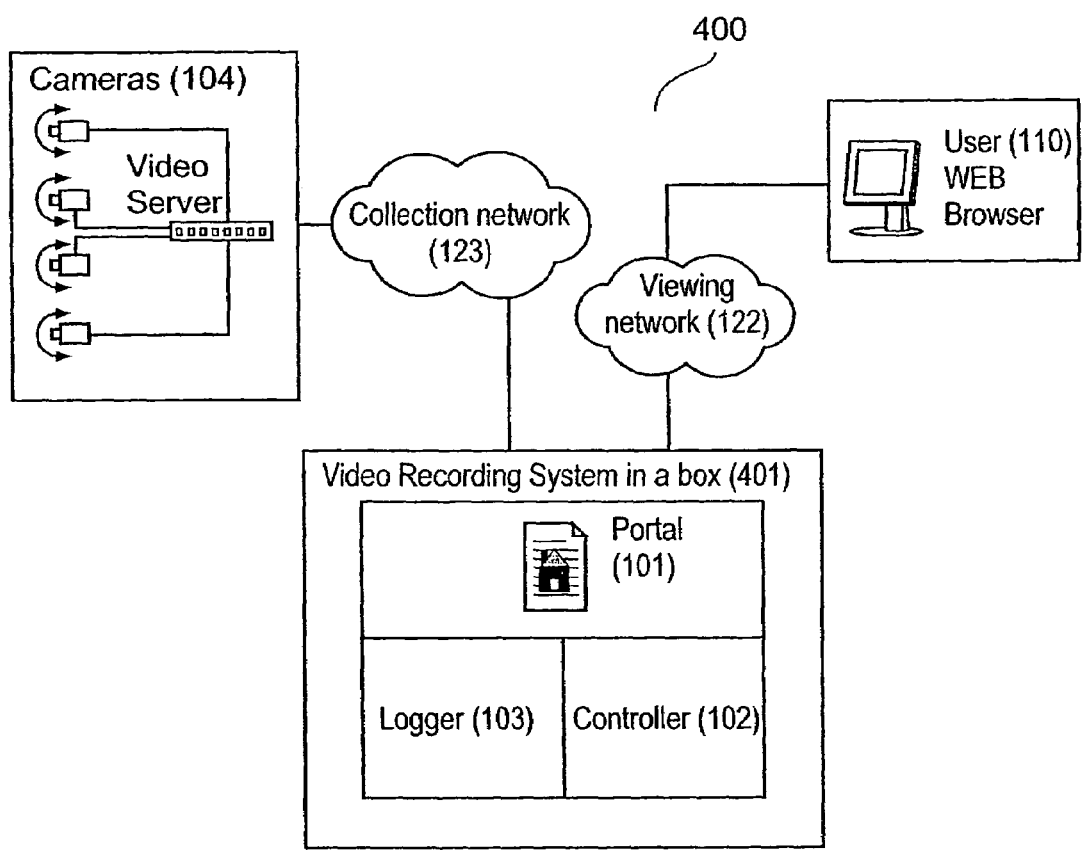
FIG. 4 shows a fourth exemplary system according to the present invention, with an exemplary "system in a box" configuration.

FIG. 4 shows a system 400, with a "system in a box" 401 configuration. Video recording system in a box 401 is actually a server which operates all three groups of functions, including portal 101, controller 102 and logger 103. Cameras 104 (which may optionally include a video server as shown) and user applications 110 interact with system in a box 401 through collection network 123 and viewing network 122, respectively. This configuration may serve relatively small, independent sites, and is preferred for relatively low traffic implementations.

FIGS. 1-4 are only intended as examples of different types of flexible architectures which are possible according to the present invention. Of course, other types of architectures may also optionally be implemented. According to customer requirements and environment constraints (cost, geographical distribution, number and location of users, network availability etc.), the basic components of each system can be "packaged" in variety of configurations.

Network bandwidth is a critical resource when implementing a network video monitoring/recording solution. The present invention enables network bandwidth to be used efficiently, by providing different types of optional solutions to different types of bandwidth problems.

The most critical part of network bandwidth is the collection network (reference number 123 in FIGS. 1-4), since typically collection is performed continuously (unlike viewing), and video data, even when compressed, requires high bandwidth. The flexibility of the system loggers to be added for receiving additional channels when the collection network can no longer support transfer from all cameras to the logger. Adding a logger requires simple modification of the system configuration defined by authorized user through the portal. Hence it is possible to add channels with a practically linear increase in cost, such that the cost per channel is similar for any number of channels, unlike other systems where cost may increase dramatically for a specific number of channels.

The viewing network (reference number 122 in FIG. 1) is separated from the collection network; hence viewing and collection bandwidth requirements are treated by the system separately and independently. To cope with bandwidth limitation in the viewing network, automatic control of video rate (application 60/324.056) is performed, optionally and preferably skipping video frames to keep time—video synchronization.

An additional tool, called Instant Replay, optionally and preferably provides compensation for lack of balance on the communication path between the user and the logger. When bandwidth limitation on the user side forces frame elimination in viewing, the user may request to open an additional window for "Instant Replay". The logger continuously keeps a window of T seconds before the current time and upon request, sends all frames from this buffer to the user for viewing. Hence the user may optionally view in real time as many frames as the bandwidth allows, and in parallel but with some delay may also optionally view the full information with time synchronization.

When high bandwidth is available, the user may optionally and preferably operate Fast Forward playback. When the bandwidth is fully used, such that no additional Fast Forward can be performed, automatic control of video frames (as mentioned above) is preferably employed to enable adjustable Fast Forward. The Instant Replay tool is then preferably used to provide time-synchronized video of the same period. Hence Instant Replay optionally and preferably reconstructs time-synchronized video, which was collected under limited bandwidth.

The internal communication network (reference number 121 in FIGS. 1-4) is used for communication between loggers and the controller. This communication preferably includes all Meta data managed by the controller related to video frames stored in its associated loggers. Each disk allocation unit or other storage unit of video frames, called a segment, has its associated Meta data stored in the controller. The size of the segment is preferably a system parameter. Hence the traffic between a controller and its associated loggers includes the description of segments and is preferably transferred when the logger saves a segment to its storage.

If the bandwidth of the network between loggers and a controller is not enough to carry this communication, one or more of the following options is preferably implemented to accommodate more data traffic. First, an increase in segment size decreases the number of messages from logger to controller. Also, the controller performance may optionally be improved to support higher efficiency of the operation of the database. A controller may also optionally be added to handle a subset of the channels/loggers.

The traffic on the communication network (reference number 120 in FIG. 1), for portal to controller communication, is typically relatively low, as it preferably carries only modifications of system layout and verification of user authorization to access recorded data.

FIGS. 1-4 are also optionally and preferably suitable for geographical distribution of the different components of the system according to the present invention. The present invention enables the operation of geographically distributed channels to be unified, with management of distributed video storage (loggers) and accessibility to recorded video at any location. These features are important advantages for a security system.

Geographical distribution is a critical feature for certain customers such as security service providers and corporations with many physically distant branches. The separation between portal and controller functionalities, and the low bandwidth communication between them, supports geographical distribution of the channels. Central management of authorization and system layout, by the portal, enables unified and parallel viewing of channels at any location on the globe. The mechanism for storage distribution can be used for storage redundancy, as described in greater detail below with regard to FIG. 6.

Figure 5A:
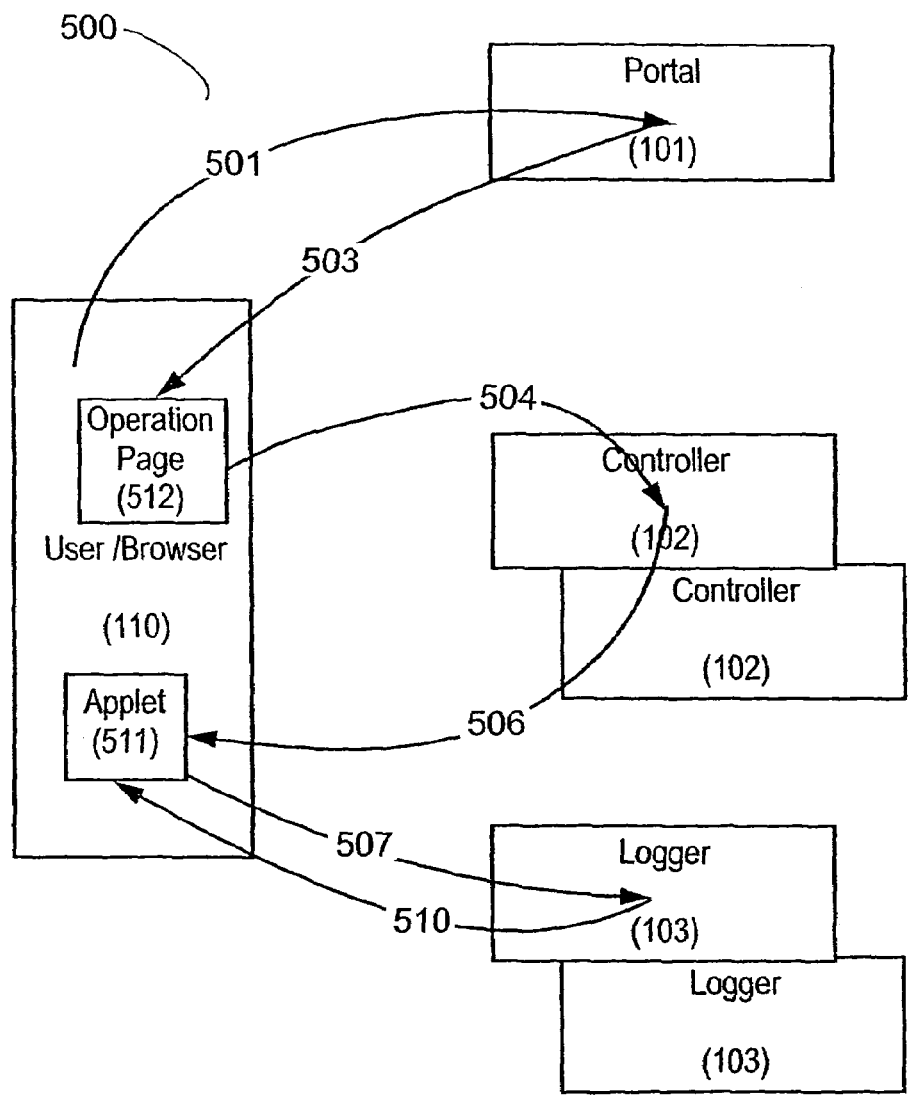
FIGS. 5A and 5B show exemplary operational flows for the system of the present invention.
Figure 5B:
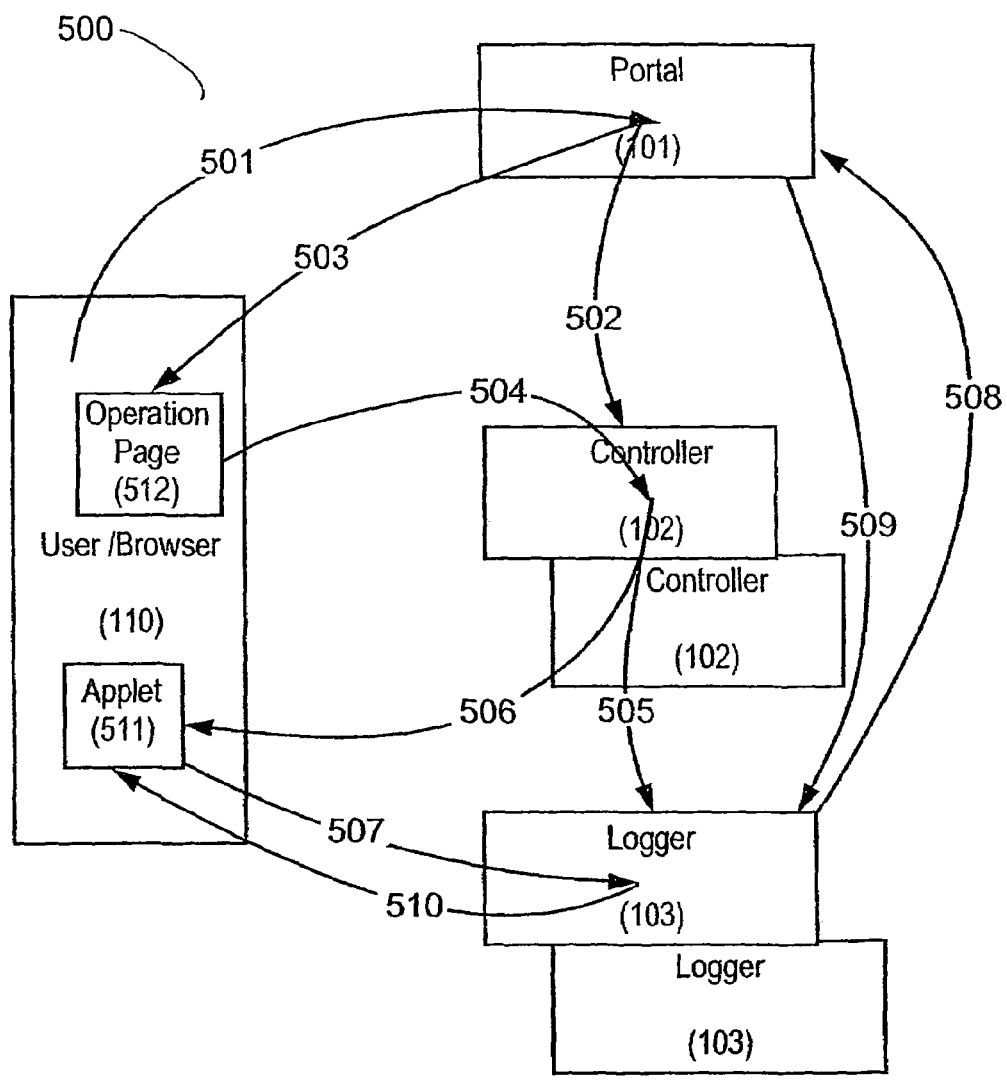

FIGS. 5A and 5B provide a description of data flow in the system, related to a user request to view video, either at real time (monitoring) or recorded. FIG. 5A shows a basic operational flow, while FIG. 5B shows an optional but preferred implementation which provides a more secure flow of operations. The explanation is given in both FIGS. 5A and 5B with regard to components from FIG. 1, certain of which are shown for clarity and for describing the flow of operations.

As shown with regard to FIG. 5A, the user operates a user application 110, which may optionally be implemented as a Web browser as shown. The user provides identity information by entering a user name and password (stage 501; all numbering is shown on the Figure to indicate the flow of each operation). This information is sent from user application 110 to portal 101. Portal 101 checks authorization for that user, according to the provided identification information. If authorization is to be granted, then portal 101 sends an operation page 512 to user application 110 (stage 503). Operation page 512 is an illustrative, non-limiting example of an authorization key according to the present invention. Operation page 512 preferably includes access information to one or more relevant controllers 102, and more preferably includes an access authorization to one or more controllers 102.

The user request for viewing video data, and/or for any other type of interaction, is now being sent to the relevant controller(s) 102 in stage 504, preferably with the authorization key. If the proper authorization is contained in the authorization key, controller 102 preferably enables user access to one or more loggers 103 by sending an applet 511 to user application 110 (stage 106). Applet 511 is again a non-limiting, illustrative example of an authorization key. User application 110 then preferably activates applet 511, which preferably sends a request to one or more logger(s) 103 (stage 507). If the authorization key is accepted, then the relevant logger 103 transfers the required video frames to user application 110 (stage 510).

The overall flow of operations in FIG. 5A demonstrates the separation of functions, which is a preferred feature of the present invention. The user, through user application 110, is not able to access the next function before a previous function has been properly executed. For example, user application 110 cannot communicate with controller 102 until portal 101 has sent operation page 512, and/or some other type of authorization key, to user application 110. Controller 102 preferably does not accept any communication from user application 110 without the authorization key. Thus, functions are separated and must also be executed sequentially in order for the user to gain access to each component of the system of the present invention.

In FIG. 5B, a more secure flow of operations is shown, in that communication between the portal, controller and logger is required, rather than having communication occur only between the portal and the user application, the controller and the user application and so forth. In FIG. 5B, the same stages as for FIG. 5A bear the same numbers. Certain other stages are also performed as described in greater detail below.

First, unlike FIG. 5A, portal 101 also sends relevant data to relevant controller(s) 102 in stage 502, upon receiving the user request in stage 501 (assuming that authorization is to be granted).

Similarly, controller 102 sends the authorization key not only to user application 110, but also sends at least authorization information to the respective logger(s) 103 (stage 505).

According to optional but preferred embodiments of the present invention, further security is provided by having portal 101 send at least authorization information also to the respective logger(s) 103 in stage 509, more preferably upon receiving a request from logger(s) 103 for such information in stage 508. These additional stage(s) provide an additional form of security, and also potentially give portal 101 greater control over the operations of the system. Most preferably, the data is not sent in stage 510 until both stages 508 and 509 have been performed.

According to other preferred embodiments of the present invention, the sequence of the above flow of operations is also controlled, such that access authorization needs to be received both from user application 110 and the previous component in the hierarchy before the next component is operative. For example, preferably controller 102 does not grant access to user application 110 until both stages 502 and 504 have been performed, and both types of authorization information and/or keys have been received by controller 102. However, optionally stages 503 and 502 could be performed in parallel.

The embodiments of FIG. 5A and FIG. 5B clearly differ from the background art, as these previously known implementations were based on granting general user access to the system. By contrast, the method and system of the present invention clearly separate functions, which must then be performed sequentially in order for the user to gain access to each component of the system.

The architecture described above is the basis for a video recording and monitoring system for security applications. Further enhancements and capabilities incorporated to the system enable scalability in terms of storage, bandwidth, computational resources and number of viewers. In addition the architecture supports geographical distribution of video sources and viewers as described below.

Figure 6A:
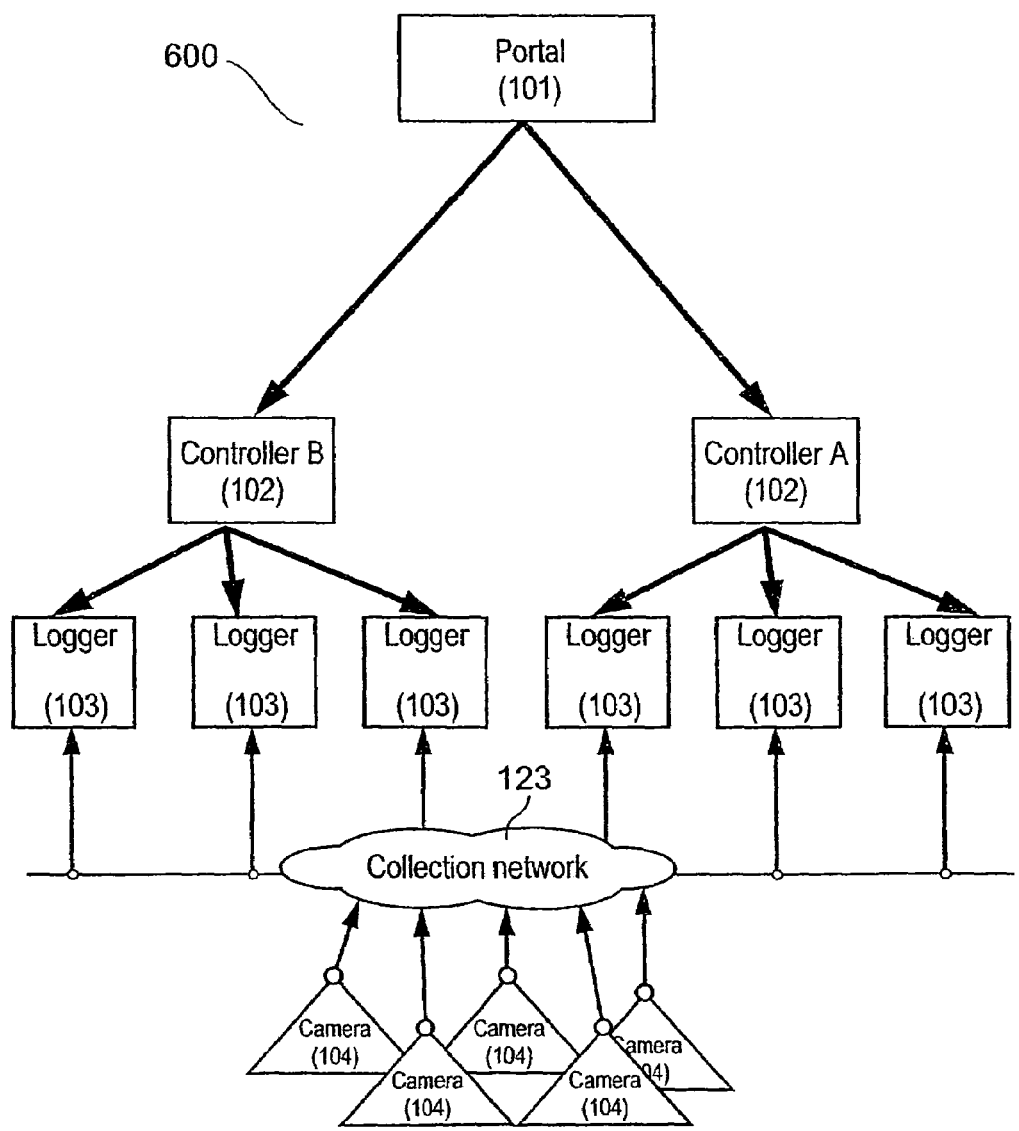
FIGS. 6A and 6B show exemplary configurations of the system according to the present invention for data storage redundancy.
Figure 6B:
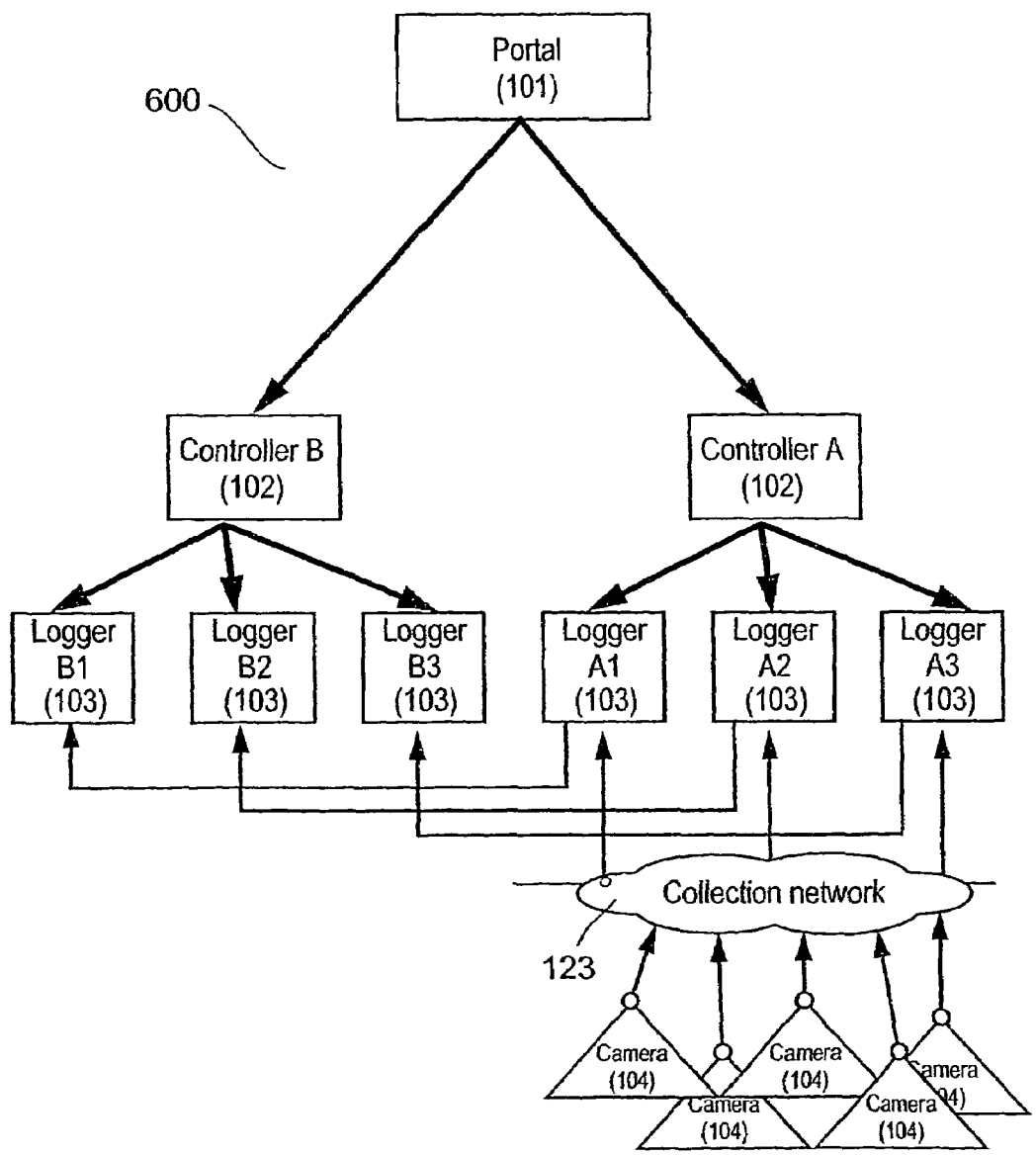

FIGS. 6A and 6B show a system 600 for demonstrating scalability of storage capacity according to the present invention, optionally with storage redundancy. For both FIGS. 6A and 6B, the captured video data is stored (optionally and preferably after compression) on disks or other storage media residing on, or communicating with logger 103. The recorded video is managed by logger 103, which optionally and preferably continuously executes a retention policy to achieve efficient storage usage, by replacing data that is no longer required.

When additional storage space is no longer available, storage capacity can optionally and more preferably further be extended by one or more of the following actions. For example, additional disks (storage media) and/or disk controllers can optionally be added. Storage area network solutions may optionally be implemented, which employ the IP interface capabilities of logger 103. Additional loggers 103 may also optionally and preferably be used, as adding a logger 103 performs scale-up of the system both in terms of storage space (adding the disks attached to it), and in terms of access capability.

According to other optional but preferred embodiments of the present invention, logger 103 enables coherent video segments to be defined. An individual, sizeable time period or duration time can optionally be attached to every such segment to be kept in the system. At the end of this time period, the disk allocation units (storage space) which hold the video segment optionally and preferably automatically return to be available for recycling, or storing new video data. The process enhances and automates storage management and recycling, thus leveraging both usability and efficiency to maximize the value of storage resources.

In addition to providing scalability of data storage resources, FIGS. 6A and 6B also demonstrate two different types of redundancy of data storage according to the present invention. In FIG. 6A, system 600 features two sets of loggers 103, labeled as "A1, A2, A3" in a first set, and "B1, B2, B3" in a second set. The number of loggers 103 in each set, as well as the number of sets, is clearly flexible and could easily be determined by one of ordinary skill in the art. Both sets of loggers 103 are connected to the same collection network 123. In turn all cameras 104 are connected to collection network 123, such that redundancy is provided by having all data from all cameras 104 pass to loggers 103 in both sets. Cameras 106 (not shown) could also be so connected to collection network 123).

FIG. 6B shows a different implementation, in which system 600 again features two sets of loggers 103, "A" and "B" as previously described with regard to FIG. 6A. However, now loggers 103 in set "A" are connected directly to collection network 123, and hence collect the data from cameras 104. Loggers 103 in set "B" are connected to loggers 103 in set "A", and retrieve data from loggers 103 in set "A" as a video source. Loggers 103 in set "B" could also optionally receive video data from another set of cameras and/or another set of loggers (not shown).

Figure 7B:
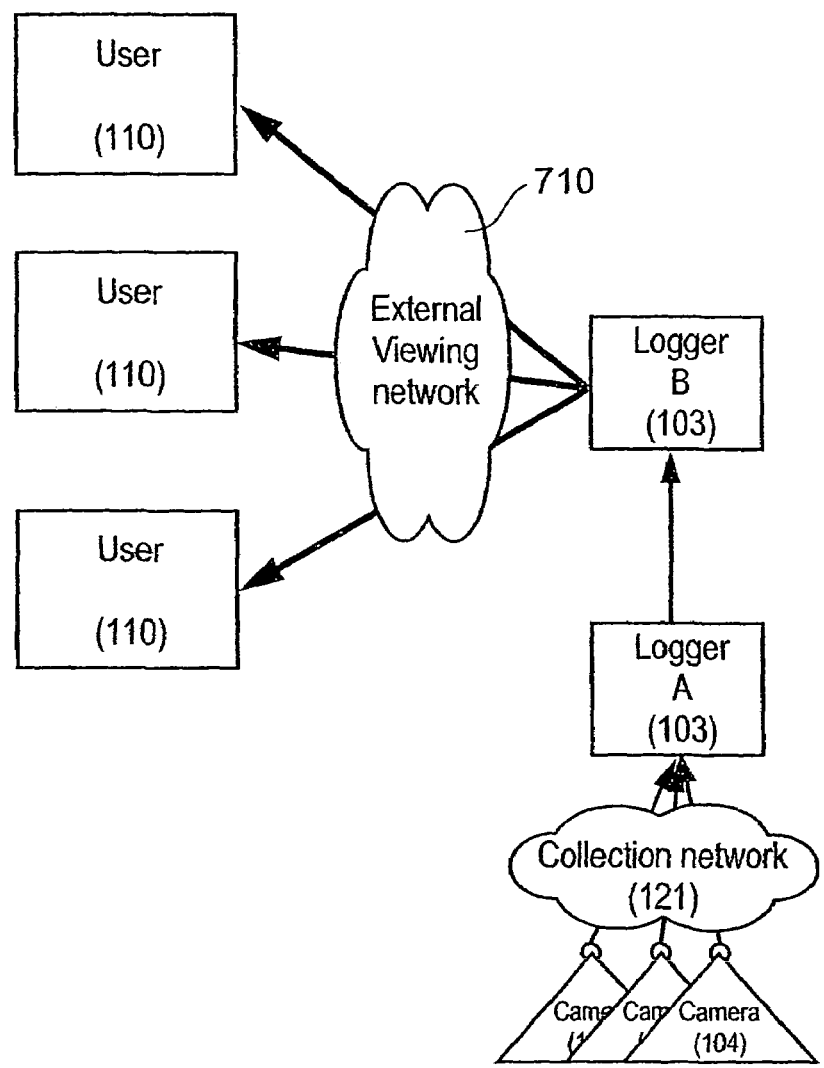
Figure 7C:
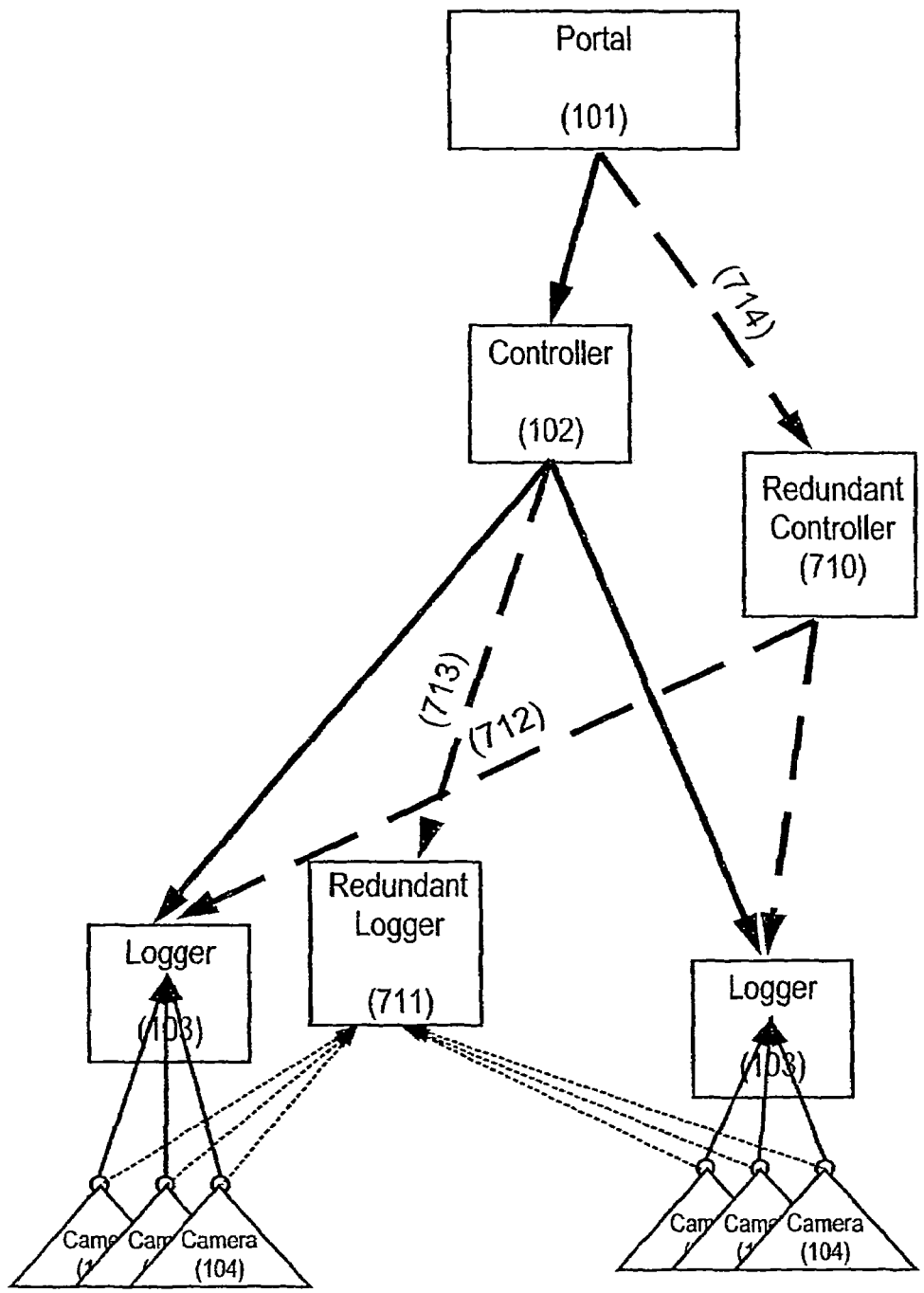

FIGS. 7A-7C show different types of system scalability according to the present invention. System scalability may optionally be implemented for providing scalable bandwidth and/or other types of scalable function. For example, scalability is also preferred for supporting additional user applications 110, as shown in FIGS. 7A(1) and 7A(2). Users, unlike channels, may have unexpected behavior patterns, causing a high demand on network bandwidth at specific times, with little or no demand at other times. As shown in FIG. 7A(1), additional loggers 103 may optionally be added at multiple sites, connecting to local loggers 103 and getting the video stream, thus offering fast access to same data by many user applications 110 at the same time.

For example, in FIG. 7A(1), a first logger 103 (labeled as "A") is connected to cameras 104; again, the system could optionally be implemented with cameras 106. A plurality of additional loggers 103 are in communication with a viewing network 700, which is also in communication with logger 103 "A". Viewing network 700 may optionally be implemented as for any of the previously described viewing networks. Now, one or more user applications 110 can each receive video data through different loggers 103.

FIG. 7A(2) shows a different implementation with a plurality of loggers 103. Here, logger 103 "A" is again connected to network 700. User 110 is now connected to a second viewing network 702, which is also connected to logger 103 (labeled "B"). Logger 103 "B" communicates with logger 103 "A" through viewing network 700. Again, additional loggers 103 can optionally be added, with additional viewing networks, in order to further increase the number of user applications 110 which can view the same data.

Both of FIGS. 7A(1) and 7A(2) demonstrate that logger cascading is possible, in which multiple layers of loggers communicate with each other, with only the top layer communicating with the user applications, and the bottom layer communicating with the cameras. Such logger cascading is optionally and preferably also performed to provide scalability of computational resources.

The preferred separation between meta data management by the controller, and continuous handling of video frames by the logger provides optimal usage of computational resources. Video management is continuous by its nature and is characterized by similar level of required CPU through time, while meta data management can be characterized as "burst" activity. Hence the separation between them provides the capability to handle the video storage without being interrupted by computations required for handling meta data. When system performance and/or channel capacity reach its limit due to CPU limitation, an additional logger and/or controller are optionally and preferably added to the system, as described in greater detail above.

FIG. 7B demonstrates that physical separation of different types of networks within the system of the present invention may optionally be performed in order to provide a higher level of security, as well as optionally to support system scalability. As shown, user applications 110 are preferably connected to an external viewing network 710, which is also in communication with a logger 103 "B". Logger 103 "B" is then in communication with logger 103 "A". Preferably, loggers 103 "B" and "A" are separated by a firewall (not shown). Logger 103 "A" then communicates with cameras 104 through collection network 121 (again cameras 106 could also optionally be used; not shown). This implementation preferably prevents user applications 110 from being able to connect physically to logger 103 "A" and/or collection network 121, and thus provides additional security against "hackers" (unauthorized users).

FIG. 7C shows that system scalability may optionally and preferably also be provided in order to support component redundancy. In this illustrative, non-limiting example, redundancy is shown with regard to loggers 103 and controllers 102; see FIGS. 6A and 6B for a description of redundancy with regard to storage capacity. FIG. 7C includes a redundant controller 710, which is also in communication with portal 101 and loggers 103, and which provides redundancy for the function of controller 102. Similarly, a redundant logger 711 provides redundancy for the functions of loggers 103, preferably by receiving data from cameras 104.

The previously described implementations of the present invention demonstrated its scalability and high levels of security. However, the present invention also has additional advantages with regard to the ability to "upgrade" existing media monitoring and/or recording systems, to add the capability to monitor and/or record an additional type of media data. Such an upgrade is preferably performed without the requirement for additional hardware and/or infrastructure, apart from the actual video sources, for video data. The description given below is centered around the addition of the capability of monitoring and/or recording video data to an existing voice logging system. However this is for the purposes of description only, and is without any intention of being limiting.

Figure 8:
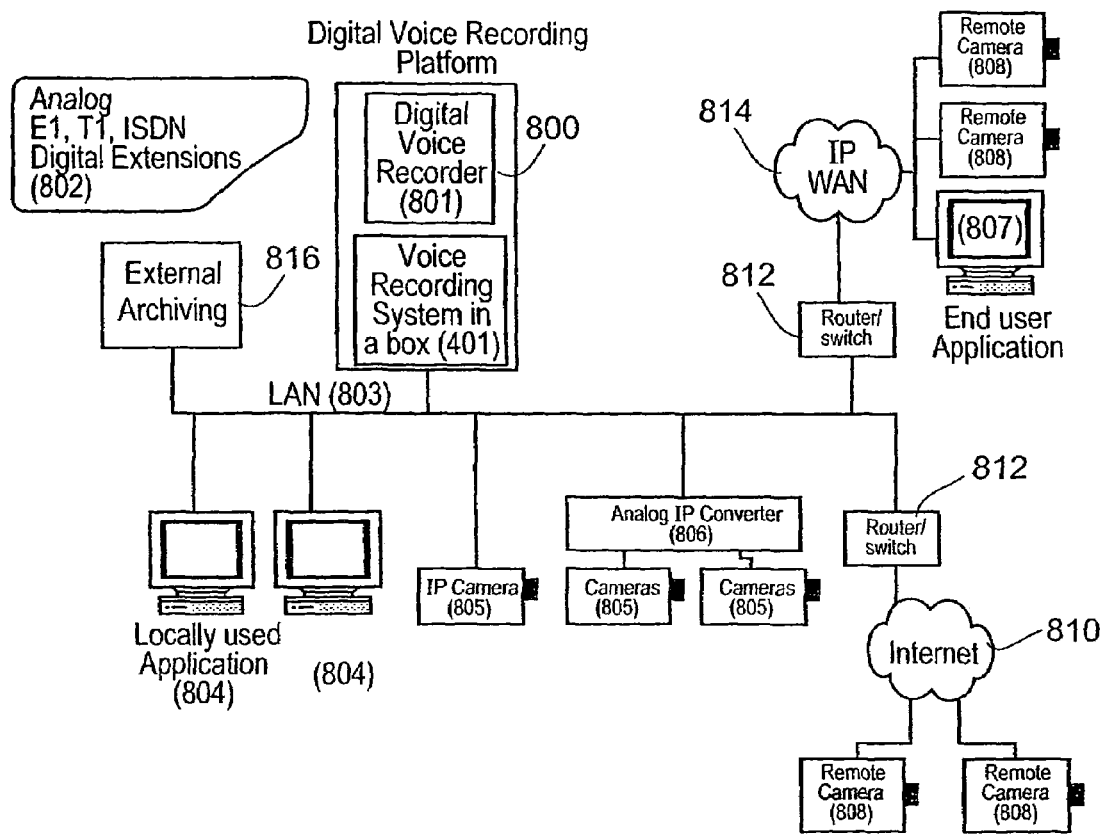
FIG. 8 shows another exemplary system according to the present invention for adding video recording capabilities to an existing audio recording facility.

FIG. 8 shows an exemplary system 800 for upgrading an existing monitoring and/or recording system for a recording a first type of media data, into a system which can monitor and/or record a second type of media data as well. In this example, system 800 provides both audio and video recording capabilities on an existing hardware platform.

As shown, system 800 features a digital voice recorder 801 which is connected to a network 803, shown as a LAN for the purposes of illustration only and without any intention of being limiting. Digital voice recorder 801 may optionally be implemented as any type of voice (audio) recording device, such as the NiceLog™ product (Nice Systems Ltd., Ra'anana, Israel) for example. Digital voice recorder 801 is preferably capable of recording a plurality of audio channels simultaneously, preferably through a plurality of voice interfaces. Each audio data (voice) interface is preferably supported by a specialized hardware interface board 802, which connects to the source of the audio data. It should be noted that many different types of audio data may be collected, and not just voice. These voice interfaces include, but are not limited to, analog telephone extensions or lines, radio lines, digital telephone extensions, E1, T1 and BT megalink trunk lines, ISDN interfaces and so forth.

Digital voice recorder 801 also preferably enables the recoding of a large number of channels per platform, which is scalable by adding more units to the system. Additionally, digital voice recorder 801 also preferably enables various audio-processing capabilities for pre- or post-processing of the recorded audio.

Although digital voice recorder 801 is described as recording "voice" as the preferred embodiment, for the purposes of the present invention, any type of audio recording may optionally be performed, in addition to or in place of voice recording.

Digital voice recorder 801 is operated by a digital voice recording platform 800. Digital voice recording platform 800 preferably includes a server and any other necessary hardware devices and/or infrastructure. Digital voice recording platform 800 may optionally and preferably be upgraded to a multimedia recording platform, by adding video recording system in a box 401, as described in FIG. 4. System in a box 401 preferably includes those software modules which are necessary for monitoring and/or recording video data. Co-existence on the same server is more preferably assisted by having video recording system in a box 401 be implemented as a Web-based application as previously described. Digital voice recorder 801 may optionally be implemented as a client-server application. Thus, these two different types of applications may optionally be operated by the same server.

In any case, digital voice recording platform 800 is preferably now able to record video frames, for example in HTTP format, which arrive from the various types of cameras that are described in greater detail below. However, this upgrade of digital voice recording platform 800 still maintains the full capabilities of the original digital voice recording functions.

The recorded video is optionally and preferably stored on a storage medium of digital voice recording platform 800 (not shown), and could also optionally be archived and stored on an external network archiving device 816 such as a jukebox.

As previously mentioned, system 800 also features a plurality of cameras 805 connected to network 803. Cameras 805 may again optionally be IP cameras, for direct connection to network 803, or alternatively may be analog cameras which are connected to network 803 through an analog to IP converter 806, which is able to convert the analog signals to data for being transmitted. Optionally, any type of converter may be used, and not only an IP converter. Additionally or alternatively, one or more remote cameras 808 may optionally be connected through another network, shown as the Internet 810 for the purposes of clarity only and without any intention of being limiting. The Internet 810 is then connected to network 803, for example through a router/switch 812 as shown. A second router/switch 812 may also optionally connect network 803 to a WAN 814, which is given as a non-limiting example of another type of network. Additional remote cameras 808 and/or remote user applications 807 may also optionally be attached to WAN 814.

The user is preferably able to access video and/or audio data through one or more of remote user applications 807 and local user applications 804. Optionally and preferably, each of these user applications 804 and 807 features a combination of the original application for accessing the voice (audio data), provided with the original implementation of digital voice recording platform 800, and an additional application for accessing the video data. More preferably, these two different applications are synchronized, for synchronizing the playback of voice and/or video data. One or both of these two different applications may optionally be implemented as a Web-based application, for example with a Web browser interface and/or with an applet (not shown).

Figure 9:
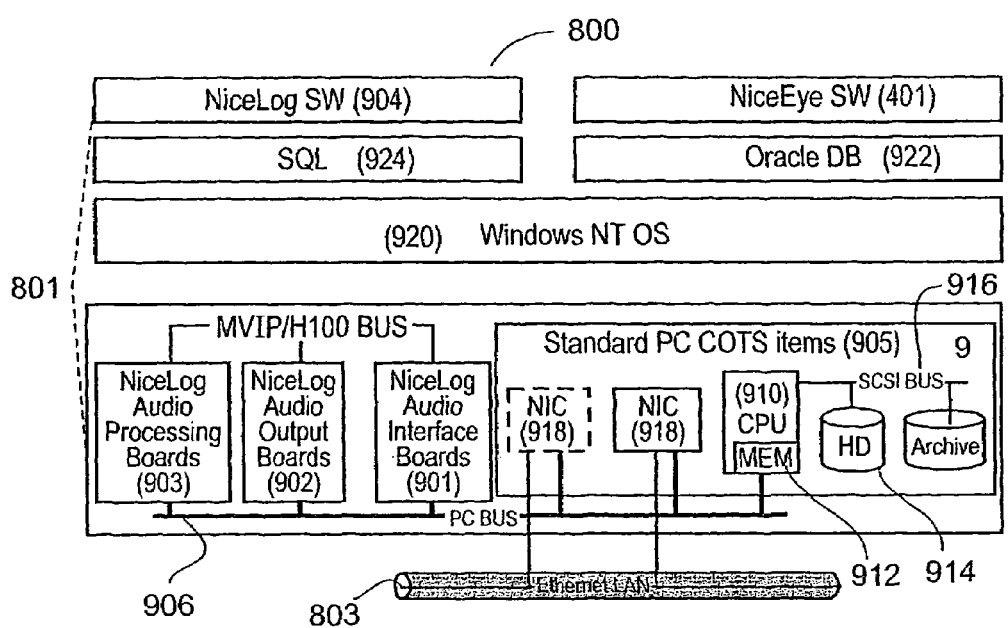
FIG. 9 shows an exemplary combined platform for video and audio recording for use with the system of FIG. 8.

FIG. 9 shows digital voice recording platform 800 in greater detail. It is assumed that the audio recording platform of FIG. 9 is provided, preferably substantially unchanged, from the manufacturer, and is then augmented to provide the additional video recording capabilities, as described in greater detail below.

As shown with regard to FIG. 9, digital voice recording platform 800 features both hardware and software components. Some of these components are particular to the original audio recorder from the manufacturer, such as the NiceLog™ product, given as a non-limiting, illustrative example above in FIG. 8 and also here in FIG. 9. In this illustration these components optionally and preferably include an audio interface board 901 for being connected to the previously described plurality of audio, and more preferably voice, interfaces; an audio processing board 902 for processing the audio data; and an audio output board 903 for playing back the audio data. These three boards are more preferably connected both to a bus 906 and to each other.

The hardware components preferably also include a set of standard computer components 905, which may optionally include a CPU 910 with an associated memory 912, optionally and preferably with a permanent storage medium 914 such as a magnetic disk or "hard disk". These components are preferably connected to a bus 916, which is also connected to one or more network cards 918 for receiving data from network 803.

The operation of digital voice recording platform 800 is optionally and preferably supported by a suitable computational device operating system 920 as shown. Operating system 920 also supports the operation of the necessary software modules which are featured in digital voice recording platform 800, such as the NiceLog™ product software module 904, which is the software audio recording module.

Digital voice recording platform 800 may also optionally and preferably feature a database 922 as shown, such as an Oracle™ database for example, with an associated SQL software module 924.

According to preferred embodiments of the present invention, all of the above components are present in digital voice recording platform 800 before the upgrade is performed. In order to be able to add video recording capabilities for this upgrade, preferably a video software recording module 401 is added, which is shown as the NiceEye™ "system in a box" product (shown in more detail in FIG. 4) for the purposes of illustration only and without any intention of being limiting (Nice Systems Ltd., Israel). Video software recording module 401 is optionally and more preferably in communication with database 922.

Both digital voice recording software 904 and video recording software module 401 preferably continue to run on the same platform resources, adding a significant video recording capability. If computation and storage resources have enough capacity to run both applications, the existing resources usage is maximized. When resources requirements increase, with additional video and/or audio resources that need to be monitored/recorded the system may be upgrade employing the architecture described above, with regard to FIGS. 1-7.

Optionally performance is enhanced by adding one or more hardware components to increase throughput of data. Such performance-enhancing hardware components are more preferably added when the existing recording platform records data that requires relatively less bandwidth than the data recording capabilities which are being added. For example, one or more network cards 918 may optionally be added for increasing bandwidth for receiving and/or transmitting data over network 803. Additional associated memory 912 and/or CPU clock cycles may also optionally be provided in order to increase the speed of data processing.

The present invention may be implemented for a wide variety of applications. Non-limiting examples of such applications include monitoring public areas and maintaining public safety; monitoring areas to be secured, such as prisons, banks, factories and so forth; pinpoint monitoring of particular sections within an area, such as gaming tables at gambling establishments, cashier tills at points of sale; and other optional applications.

In addition, although the example given above with regard to FIGS. 8 and 9 is for adding video recording capabilities to an existing audio recording platform, in fact substantially any combination of recording capabilities may be made. For example, audio recording capabilities could optionally be added to an existing video recording platform. Text recording capabilities, for example for "chat" and/or e-mail messages, could optionally be added to any type of recording platform.

What is claimed is:

1. A scalable system for recording video data, comprising:
  (a) at least two video cameras;
  (b) a logger connected to said at least two video cameras for recording video data received from said at least video cameras
  (c) a controller for controlling said logger, wherein said controller sets at least one parameter for said logger and for recording the video data;
  (d) a portal for controlling access to said controller, said logger and said at least two video cameras, such that access to video data is determined by said portal, wherein said portal is capable of controlling a plurality of controllers and each controller is capable of controlling a plurality of loggers; and
  (e) a user application to communicate sequentially in hierarchy with said portal, said controller and said logger, wherein in order for a user operating said user application to receive authorization to access said video data of a particular video camera, said user application is first to obtain access to the controller controlling the logger connected to said particular video camera based on receipt of permission from said portal and then said user application is to grant access to said logger connected to said particular video camera conditional upon receipt of permission from said controller.

2. The system of claim 1, wherein said user application further determines at least one parameter of at least one of said controller, said logger, said channel and said at least one of said video cameras.

3. The system of claim 1, wherein said portal controls access to said at least one of said controller, said logger, said channel and said video cameras by said user application.

4. The system of claim 3, wherein said user application communicates sequentially with said portal, said controller and said logger, before being able to play back said video data.

5. The system of claim 4, wherein said portal communicates with said controller before said user application is allowed to communicate with said controller.

6. The system of claim 5, wherein said controller communicates with said logger before said user application is allowed to communicate with said logger.

7. The system of claim 6, wherein said portal communicates directly with said logger before said user application is allowed to receive said video data from said logger.

8. The system of claim 1, wherein said logger also collects meta data related to said video data from at least one of said video cameras.

9. The system of claim 8, wherein said controller manages said meta data.

10. The system of claim 8, wherein said meta data includes at least one of identification of said video data by at least one of time and channel, and a link for fast access to the relevant frames in said video data.

11. The system of claim 1, further comprising:
  (f) at least one network, wherein at least a portion of said cameras, said logger, said controller and said portal are connected by said at least one network.

12. The system of claim 11, wherein said logger is connected to said at least one of said at least two video cameras by a collection network, such that said at least one network includes said collection network.

13. The system of claim 12, wherein a plurality of loggers is connected to said collection network, such that video from at least one of said at least two video cameras is recorded redundantly by said plurality of loggers.

14. The system of claim 12, wherein a hierarchy of a plurality of loggers is connected to said collection network, said hierarchy comprising at least one lower logger layer and at least one upper logger layer, such that said user application communicates with a logger in said upper logger layer and said video camera communicates with a logger in said lower logger layer.

15. The system of claim 12, wherein said user application communicates with said logger being a first logger and said collection network is connected to a second logger, wherein said first logger and said second logger are physically separate.

16. The system of claim 11, wherein said logger is connected to said controller by a communication network, such that said at least one network includes said communication network.

17. The system of claim 11, wherein said controller is connected to said portal by a second communication network.

18. The system of claim 11, wherein said user application is connected to said portal, said controller and said logger by a viewing network, such that said at least one network includes said viewing network.

19. The system of claim 1, further comprising an additional logger for receiving data from said logger, such that said logger is a video source for said additional logger.

20. The system of claim 1, further comprising an additional controller for communicating with said at least one logger, such that said additional controller provides redundancy.

21. The system of claim 1, wherein at least one of said portal, said controller and said logger is implemented as a Web-based application.

22. A method of operating a scalable system for recording video data, comprising:
    capturing video data by a plurality of video cameras;
    recording captured video data by a plurality of loggers connected to said video cameras,
    setting at least one parameter for said loggers by a plurality of controllers;
    providing access to said controllers, said loggers, and said video cameras by a portal, wherein providing said access to video data of a particular video camera comprises:
        receiving permission from said portal to access the controller controlling the logger connected to said particular video camera, and
        receiving access to the logger connected to the particular video camera, wherein access to the logger is subsequent to and conditional upon permission to access the controller.

23. The method of claim 22, further comprising playing back said video data of the particular camera conditional upon receiving access to the logger connected to the particular video camera.

24. The method of claim 22, further comprising collecting meta data related to said video data from said video cameras by said loggers respectively connected to said video cameras.

25. The method of claim 24, further comprising managing said meta data by said controller.

26. The method of claim 24, wherein said meta data includes at least one of identification of said video data by at least one of time and channel, and a link for fast access to the relevant frames in said video data.

* * * * *